United States Patent
Sanderford, Jr.

(10) Patent No.: US 8,884,774 B2
(45) Date of Patent: Nov. 11, 2014

(54) UNIVERSAL SOFTWARE DEFINED HOME GATEWAY

(75) Inventor: H. Britton Sanderford, Jr., New Orleans, LA (US)

(73) Assignee: M&FC Holding, LLC, Raleigh, NC (US)

( * ) Notice: Subject to any disclaimer, the term of this patent is extended or adjusted under 35 U.S.C. 154(b) by 995 days.

(21) Appl. No.: 12/414,842

(22) Filed: Mar. 31, 2009

(65) Prior Publication Data

US 2009/0243869 A1 Oct. 1, 2009

Related U.S. Application Data

(60) Provisional application No. 61/041,333, filed on Apr. 1, 2008.

(51) Int. Cl.
G08B 21/00 (2006.01)
H04W 84/02 (2009.01)
G01D 4/00 (2006.01)

(52) U.S. Cl.
CPC ............. *G01D 4/002* (2013.01); *Y02B 90/246* (2013.01); *Y04S 20/32* (2013.01); *Y02B 90/241* (2013.01); *Y04S 20/42* (2013.01)
USPC ............................. 340/657; 370/401; 702/62

(58) Field of Classification Search
USPC ............................ 340/3.1, 531, 540, 637, 657, 340/870.01–870.03; 370/338, 401, 466; 379/106.03; 455/405, 414.1–414.2, 455/423; 702/60–62; 709/249, 227–229
See application file for complete search history.

(56) References Cited

U.S. PATENT DOCUMENTS

| | | | |
|---|---|---|---|
| 5,528,507 A * | 6/1996 | McNamara et al. | 700/286 |
| 5,570,084 A | 10/1996 | Ritter et al. | |
| 5,808,558 A | 9/1998 | Meek et al. | |
| 5,923,269 A * | 7/1999 | Shuey et al. | 340/870.02 |
| 6,014,089 A | 1/2000 | Tracy et al. | |
| 6,088,659 A | 7/2000 | Kelley et al. | |
| 6,181,258 B1 | 1/2001 | Summers et al. | |
| 6,437,692 B1 | 8/2002 | Petite et al. | |
| 6,836,737 B2 | 12/2004 | Petite et al. | |
| 6,891,838 B1 | 5/2005 | Petite et al. | |

(Continued)

FOREIGN PATENT DOCUMENTS

WO 99/18553 A1 4/1999
WO 2005/010214 A2 2/2005

OTHER PUBLICATIONS

PCT Search Report dated Feb. 12, 2010.

*Primary Examiner* — Benjamin C Lee
*Assistant Examiner* — Stephen Burgdorf
(74) *Attorney, Agent, or Firm* — Andrus Intellectual Property Law, LLP (57) ABSTRACT

A system and method for communicating energy or water consumption related information from a plurality of RF enabled peripheral devices in a home, such as utility meters, thermostats, appliances and load controllers. The system includes a home gateway that enables wireless RF peripheral devices in a home to communicate to a WAN network, such as the internet. The home gateway contains a RF multi-band software defined radio that is fully programmable and configurable so that it is capable of emulating, transmitting, and receiving any of a plurality of RF protocols over multiple RF channels. The home gateway supports commonly used interfaces for communicating to the public WAN network. The system also supports future peripherals that do not exist today due to the flexibility of the home gateway.

9 Claims, 6 Drawing Sheets

(56) References Cited

U.S. PATENT DOCUMENTS

| | | |
|---|---|---|
| 6,914,533 B2 | 7/2005 | Petite |
| 6,914,893 B2 | 7/2005 | Petite |
| 6,985,087 B2 * | 1/2006 | Soliman .................. 340/870.02 |
| 6,996,154 B2 | 2/2006 | Haas |
| 7,053,767 B2 | 5/2006 | Petite et al. |
| 7,119,676 B1 * | 10/2006 | Silverstrim et al. .......... 340/531 |
| 7,145,474 B2 | 12/2006 | Shuey et al. |
| 7,239,250 B2 | 7/2007 | Brian et al. |
| 7,301,476 B2 | 11/2007 | Shuey et al. |
| 7,319,870 B2 * | 1/2008 | Olson et al. ................ 455/432.1 |
| 8,130,735 B2 * | 3/2012 | Rofougaran .................. 370/338 |
| 8,183,995 B2 * | 5/2012 | Wang et al. ............... 340/539.1 |
| 8,332,055 B2 * | 12/2012 | Veillette ......................... 700/20 |
| 2002/0080728 A1 * | 6/2002 | Sugar et al. ................... 370/252 |
| 2004/0017794 A1 * | 1/2004 | Trachewsky .................. 370/338 |
| 2004/0034484 A1 * | 2/2004 | Solomita et al. ............... 702/62 |
| 2004/0133689 A1 * | 7/2004 | Vasisht ......................... 709/228 |
| 2006/0036795 A1 | 2/2006 | Leach |
| 2006/0187866 A1 | 8/2006 | Werb et al. |
| 2008/0037454 A1 * | 2/2008 | Werb et al. .................... 370/310 |
| 2008/0075009 A1 * | 3/2008 | Picard ........................... 370/238 |
| 2008/0075218 A1 * | 3/2008 | Monier et al. ................ 375/371 |
| 2008/0177678 A1 * | 7/2008 | Di Martini et al. ........... 705/412 |
| 2008/0272934 A1 * | 11/2008 | Wang et al. ............... 340/870.11 |
| 2010/0329156 A1 * | 12/2010 | Sun et al. ...................... 370/259 |
| 2011/0193719 A1 * | 8/2011 | Monier ..................... 340/870.02 |
| 2012/0014363 A1 * | 1/2012 | Hassan et al. ................. 370/338 |

\* cited by examiner

UNIVERSAL SOFTWARE DEFINED HOME GATEWAY

CROSS-REFERENCE TO RELATED APPLICATION

The present application is based on and claims priority to U.S. Provisional Patent Application Ser. No. 61/041,333, filed on Apr. 1, 2008.

BACKGROUND OF THE INVENTION

The present disclosure generally relates to a system and method for communicating information from a plurality of devices in a home to a remote location. More specifically, the present disclosure relates to a method and system that can communicate utility-related information from a home to a remote site, such as a utility, through either a home gateway located within a home or a utility gateway positioned remotely from the home.

Presently, various different systems exist for a utility to receive consumption information from a plurality of meters distributed throughout a remote area. Many of these systems incorporate a gateway positioned within a neighborhood or a defined area that communicates using an RF local area network (LAN) to a plurality of meters distributed within an area surrounding the gateway. Typically, the gateway includes some type of communication device that allows the gateway to communicate over a wide area network (WAN) with a utility provider. This wide area network can be various systems, such as a public telephone system, the internet, or one of various other types of communication platforms.

In currently available advanced meter infrastructure (AMI) systems, the utility gateway is positioned on a tower or pole such that the gateway has a clear communication path for RF signals to reach the various meters distributed in the area. Although these types of AMI systems currently work effectively to receive utility consumption information from meters located within customer homes, the utility gateways must be mounted on towers or poles, which requires capital infrastructure expenditures by the utility. Further, the utility poles and towers must be distributed in desired locations to provide communication to a large number of meters. In rural areas, AMI systems are often not cost effective due to the low density of the meters in such locations.

Current developments in radio frequency communications have led to the inclusion of radio frequency communication devices in various home appliances, such as refrigerators, thermostats and other large appliances. These radio frequency communication devices allow the devices to communicate either with each other or with a monitoring device located within the home. The monitoring device allows a user to monitor energy consumption, operating characteristics, or other important information regarding the operation of the RF equipped devices. However, since the RF equipped devices may be provided by different manufacturers, the RF equipped devices located within a home often communicate utilizing various different types of RF protocols. These RF protocols may include GSM, Zigbee, Bluetooth, as well as other proprietary RF protocols or protocols yet to be developed. Thus, it is often difficult for devices to communicate with each other, or with a central location, utilizing the various different RF protocols available.

SUMMARY OF THE INVENTION

The present disclosure relates to Universal Software Defined Home Gateway (USDHG), which is a device that enables wireless RF peripheral devices in a home to seamlessly communicate to a backhaul public WAN network, such as the internet.

The home gateway contains a RF multi-band software defined radio. The radio is fully programmable and configurable so that it is capable of emulating, transmitting, and receiving any of a plurality of RF protocols. The radio is capable of multi-band operation so that it can simultaneously communicate with peripheral devices that operate on significantly different frequencies. The multi-band radio is capable of operating over multiple channels such that the radio can communicate over portions of different radio spectrums. The home gateway radio is capable of full-duplex operation, which enables it to simultaneously transmit and receive RF messages. The home gateway radio is also capable of half-duplex operation so that it either only transmits or receives RF messages at the same time.

The home gateway supports commonly used interfaces for communicating to the public WAN network, such as but not limited to DSL, Cable Modem, Phone Modem, USB, Ethernet, GSM, RF Modem, etc . . . These interfaces are used to pass data back and forth between the peripherals and the backend over public WAN networks. The backend may be located at various monitoring locations, such as at a utility provider, a security company or any other location that could monitor the status of a home.

The home gateway may be a printed circuit board (PCB) that plugs into commonly used third party devices such as cable set top boxes. The home gateway may be a fully stand alone packaged box product that has backend interface connections as described above. Alternatively, the home gateway can be incorporated into other device within the home, such as within one of the home appliances or within the metering endpoint, such as the electricity meter. Alternatively, the home gateway could be incorporated within a local collector such that the local collector could receive information from devices located within more than one home.

The home gateway is capable of downloading all required digital signal protocols (DSP) and protocol firmware files via the backend (i.e. Ethernet) so that it is fully migratable and upgradeable to new protocols while in the home or plant. It is contemplated that the home gateway would be pre-loaded with a common set of RF protocols and could be upgraded with other RF protocols as desired using the backend communication.

The home gateway is capable of communicating to peripherals over the following standards and RF protocols, but not limited to them:
  IEEE 802.15.4 Zigbee
  GSM
  Sensus FlexNet
  Wi-Fi (IEEE 802.11.x)
  Bluetooth
  Any third party AMI protocol
  Sensus RadioRead The home gateway may communicate to the following types of peripheral devices but is not limited to them.
  Sensus FlexNet RF Water, Gas, and Electric Meters
  Sensus RadioRead RF Water, Gas, and Electric Meters
  GSM RF modems
  Programmable Controllable Thermostats (PCTs)
  RF enabled Electric Utility Load Controllers
  Any home smart appliances that are RF enabled
  RF enabled water, gas and electric meters The home gateway is capable of transferring local metering data received from the meters over an RF local area network (LAN), over the public WAN systems to the water, gas, and or electric utilities' backend and billing systems.

The home gateway is capable of communicating and networking via RF to other nearby home gateways as a backup in the event that the public WAN connection to the home gateway fails. Home gateways may communicate to each other using Sensus FlexNet, Zigbee, IEEE 802.15.4, Wi-Fi protocol standards but are not limited to them.

The present disclosure relates to a system and method for communicating energy or water consumption related information from a plurality of RF enabled peripheral devices in a home, such as utility meters, thermostats, appliances and load controllers. The system includes a home gateway, which is a device that enables wireless RF peripheral devices in a home to seamlessly communicate to a backhaul public WAN network, such as the internet.

The home gateway contains a RF multi-band software defined radio. The radio is fully programmable and configurable so that it is capable of emulating, transmitting, and receiving any of a plurality of RF protocols. The radio is capable of multi-band operation so that it can simultaneously communicate with peripheral devices that operate on significantly different frequencies and/or protocols. The multi-band radio is capable of operating over multiple channels such that the radio can communicate over portions of different radio spectrums. The home gateway radio is capable of full-duplex operation, which enables it to simultaneously transmit and receive RF messages. The home gateway radio is also capable of half-duplex operation so that it either only transmits or receives RF messages at the same time. The home gateway supports commonly used interfaces for communicating to the public WAN network. These interfaces are used to pass data back and forth between the peripherals and the backend over public WAN networks. The backend may be located at various monitoring locations, such as at a utility provider, a security company or any other location that could monitor the status of a home.

The home gateway supports a two-step business process. In the first step, virtually any present day AMI infrastructure can be used to garner immediate benefits to utilities. In the second step, the home gateway allows connectivity to the water, gas and electric meters and other AMI devices by means of the home gateway. The system also supports future peripherals that do not exist today due to the flexibility of the software defined radio of the home gateway.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
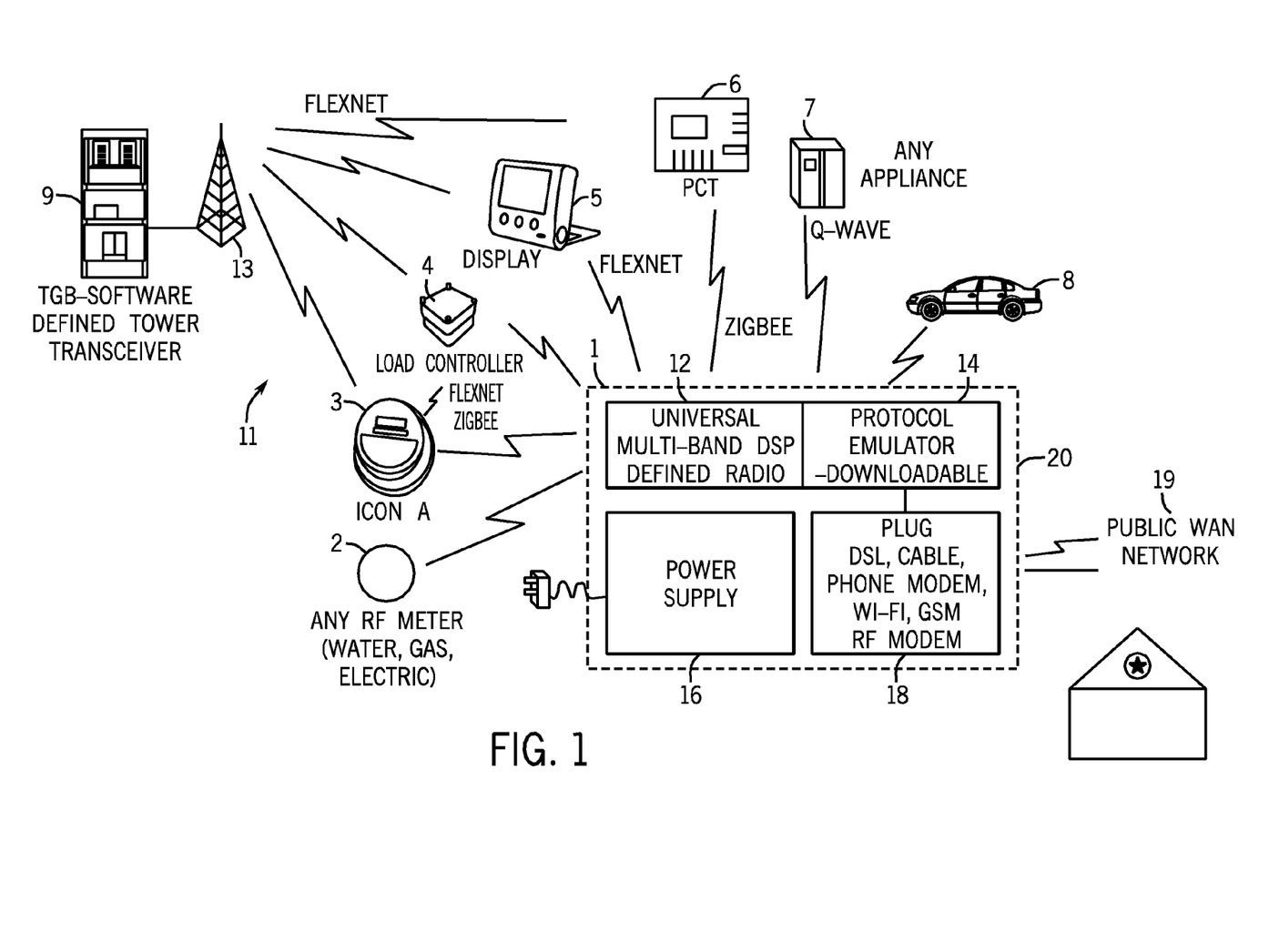
FIG. 1 is a schematic overview of the communication between a home gateway and a plurality of devices located within the home, as well as the communication between several of the devices and an advanced meter infrastructure (AMI) system.

FIG. 1 illustrates a home gateway 1 in a typical application where various dissimilar peripheral devices are communicating with the home gateway 1. In the embodiment shown in FIG. 1, the home gateway 1 is a Universal Software Defined Home Gateway (USDHG) with its major components illustrated.

The home gateway 1 is capable of communicating to any RF enabled water, gas, electric meter 2, over any third party AMI RF protocol. This includes but is not limited to protocols from CellNet, L&G, Elster, Itron, etc.

The electric meter 3 is also capable of communicating with the home gateway 1 along with an electric load controller 4. The communication link between the electricity meter 3 and the load controller 4 can take place using different RF protocols. In the embodiment illustrated, the electric meter 3 is a Sensus RF enabled iConA meter that communicates using a proprietary FlexNet protocol. However, other types of electricity meters 3 are contemplated as being within the scope of the present disclosure.

A generic display peripheral device 5 may send data to the home gateway 1 using the FlexNet protocol while a programmable controllable thermostat (PCT) 6 may communicate to the home gateway via the Zigbee protocol. Both of the communication protocols set forth above with respect to the display device 5 and the programmable controllable thermostat 6 are set forth for illustrative purposes only, since various other types of communication protocols could be utilized to communicate between the home gateway 1 and the various devices.

Any smart home appliance (or application) 7 may communicate with the gateway via the Q-wave standard. As an example, the home appliances 7 may include a refrigerator, stove, dishwasher, washer or dryer or other types of appliances that are RF enabled to communicate operating information regarding the appliance. Again, other types of RF protocols are contemplated to facilitate communication between the home appliances 7 and the home gateway 1.

A GSM RF modem 8 may communicate to the gateway using the GSM standard. In the embodiment shown in FIG. 1, the modem 8 is shown incorporated within an automobile. However, it should be understood that the modem 8 could be incorporated within any type of device and communicate back to the home gateway 1 using a conventional communication protocol.

As illustrated in FIG. 1, components of an AMI system 11 are also shown communicating to several of the devices 3-6. This communication typically takes place utilizing an AMI protocol, such as a FlexNet RF protocol, between a utility gateway 9 typically mounted to a tower 13. In the embodiment shown in FIG. 1, the utility gateway 9 is a Sensus FlexNet TGB (Tower Gateway Box). However, various different other types of AMI systems 11 could be utilized while operating within the scope of the embodiment shown in FIG. 1. The gateway 9 communicates with each of the devices 3-6 through an RF local network such that the utility gateway 9 can receive energy consumption information or issue load control commands utilizing the RF communication protocol. The AMI system 11 shown in FIG. 1 is a currently available AMI system from Sensus Metering Systems and is sold under the FlexNet name.

Figure 2:
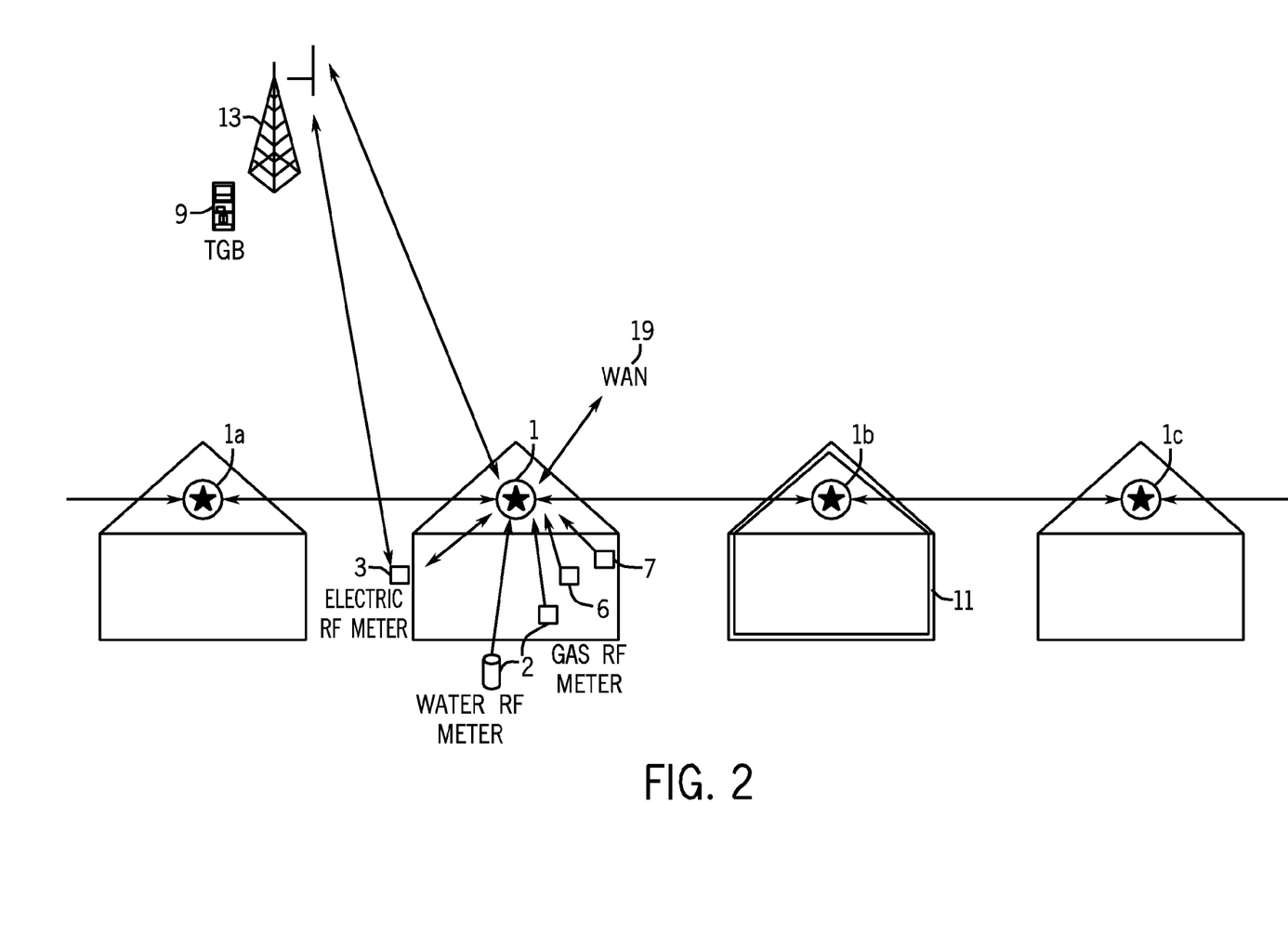
FIG. 2 is a schematic overview of the communication between a home gateway and the AMI system, as well as the communication between the home gateway in one home and another home gateway in a nearby home.

FIG. 2 illustrates the home gateway 1 in a field application scenario in which the home gateway 1 is communicating with the utility gateway 9, such as a Sensus FlexNet TGB, as well as other nearby home gateways 1a, 1b. Electric, water, and gas RF meters 2, 3, and various dissimilar peripheral devices 7 and the thermostat 6 are concurrently communicating to the home gateway 1 utilizing various RF protocols.

The home-to-home RF links between the home gateways 1 may use the FlexNet RF protocol, Wi-Fi, and/or Zigbee but are not limited to them. As illustrated in FIG. 2, if the home gateway 1 is unable to communicate over a wide area network (WAN) 19, such as if an internet connection to the home gateway 1 is lost or interrupted, it is contemplated that the home gateway 1 may communicate to one of the home gateways 1a, 1b located within RF communication range. In such an embodiment, the home gateway 1 would communicate information to and from the various devices 4-7. The information collected from the devices within the home would be transferred by RF communication protocol to one of the other home gateways 1a, 1b. The receiving home gateway 1a or 1b could then, in turn, communicate over the wide area network to the utility, assuming that the link to the LAN from the home gateway 1a or 1b is in tact. In this manner, the home gateway 1 can communicate over a WAN even though the connection between the home gateway 1 and the WAN is disturbed.

Referring back to FIG. 1, the home gateway 1 is shown as including a universal multi-band DSP defined radio 12, a protocol emulator 14, a power supply 16, as well as a communication module 18 for communicating with the public WAN 19. The multi-band radio 12 is capable of operating over multiple channels such that the radio can communicate over various portions or chunks of different radio spectrums. In the embodiment shown in FIG. 1, all of the components 12-18 are illustrated as being included within a single housing 20. However, it is contemplated that the various modules 12-18 could be included in different components that would communicate to each other through conventional communication techniques.

Although the home gateway 1 is shown in FIG. 1 as being located separate from the various devices 2-8, it is contemplated that the home gateway 1 could be incorporated into any one of the devices shown in FIG. 1. As an example, the home gateway could be incorporated into the programmable thermostat 6 or within the electricity meter 3. In such an embodiment, the operational components of the home gateway 1 would be incorporated into the specific device such that the device would not only carry out its designated function, but would also act as the home gateway. As an example, if the home gateway 1 were incorporated into the programmable thermostat 6, the programmable thermostat 6 would still carry out all of the functions of the thermostat. In addition, the thermostat 6 would act as the home gateway to receive information from the various devices and relay the information to a utility either over the AMI system 11 or the public WAN 19.

Figure 3:
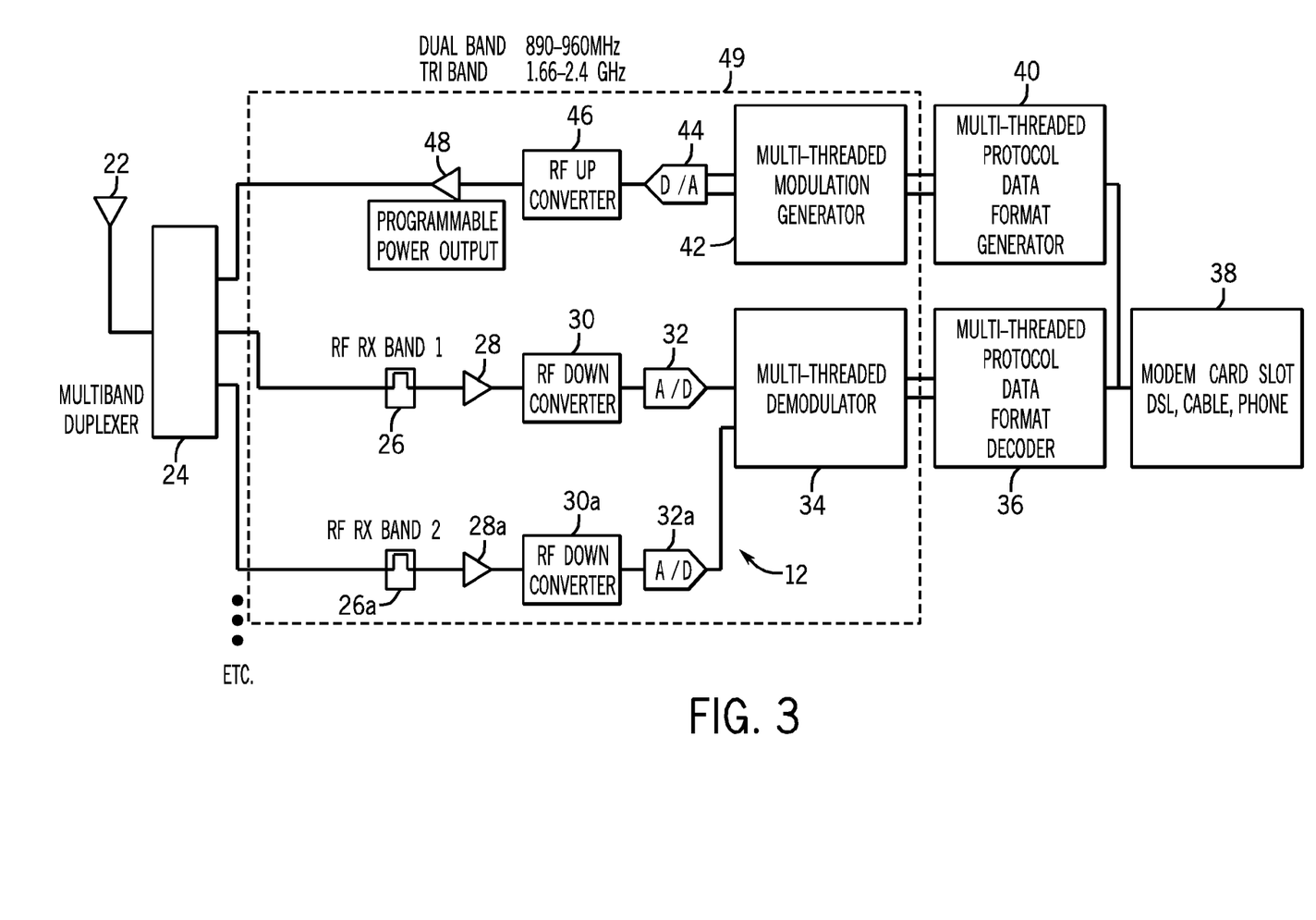
FIG. 3 is an operational block diagram illustrating the components of the home gateway for communicating utilizing multiple RF protocols.

Referring now to FIG. 3, thereshown is a top level functional block diagram for the home gateway radio 12. The radio 12 includes an antenna 22 that will be broadband such that it has reasonable performance parameters at all the required RF bands such as 900 MHz licensed, 900 MHz ISM, 2.4 GHz ISM, etc.

A multi-band duplexer 24 allows the RF signals to be received at various RF bands simultaneously. The duplexer will also facilitate full duplex operation of the radio 12 where incoming RF signals can be received at the same time as RF transmissions occur.

A RF band pass filter 26 with a passband at a first desired RF frequency range is used to filter out excess RF noise and limit out of band interference. The signal from the filter 26 is received by a Low Noise Amplifier (LNA) 28 that is used to amplify the received RF signal while limiting the added noise level to a minimum.

The received RF signal will be downconverted in frequency to some lower Intermediate Frequency (IF) by the RF downconverter 30. The down converted signal from the converter 30 is received in an analog to digital converter 32 that takes the downconverted analog baseband or IF signal and digitizes it into a stream of ones and zeroes in the digital domain.

In the embodiment shown in FIG. 3, the multi-band duplexer 24 feeds a pair of channels that each are centered around a different RF frequency. In the embodiment shown in FIG. 3, the radio 12 includes two RF bands. However, it is contemplated that the radio 12 could include additional bands each having different RF frequencies. In the embodiment shown in FIG. 3, the second band includes an RF band pass filter 26a, an amplifier 28a, a down converter 30a and an analog to digital converter 32a.

A multi-threaded demodulator 34 demodulates the digitized RF received signals received simultaneously from the multiple RF downconverters 30, 30a, which are centered at different RF frequencies. The demodulation of the RF signals is achieved using Digital Signal Processing (DSP) techniques.

A Multi-Threaded Protocol Data Format Decoder 36 similarly decodes the unique protocol packet data using DSP techniques. The demodulated and decoded RF packet data from various dissimilar protocols is passed along to the back-end using WAN type interfaces shown by reference number 38. In the embodiment shown in FIG. 3, the different types of WAN interfaces can include a modem card, a DSL connection, cable modem or conventional telephone modem. In any event, the WAN interface 38 allows the radio 12 to communicate to the backend using a WAN interface.

In addition to receiving information, the radio 12 is also capable of communicating information from the radio to various devices utilizing various different RF protocols. As illustrated in FIG. 3, raw data that is required to be transmitted is encoded in the Protocol Data Format Generator block 40 based on the specific required RF standard or protocol. Similarly block 42 imposes baseband modulation on the packetized data. These functions are achieved using DSP techniques.

The digital to analog converter (D/A) 44 takes the in phase (I) and quadrature (Q) encoded and modulated digital baseband data from DSP blocks 40 and 42 and converts the data to analog baseband or IF signals.

Block 46 serves to upconvert the IF or baseband analog I and Q signals to the required RF transmission frequencies. This may include a quadrature modulator allowing various RF modulation schemes such as BPSK, QPSK, FSK to be implemented without the need to change hardware.

The RF power amplifier (PA) 48 serves to amplify the modulated RF signal. The output RF power of the PA will also be programmable such that it meets the output requirements of the specific RF protocol currently being transmitted.

Block 49 may be a combination of various RFICs, ASICs, DSP, and FPGA ICs used to modulate and demodulate RF Signals into digital bits. Some of the RF transmit, receive, modulation, and demodulation functions may be fulfilled, for example, by RF ICs such as the Analog Devices Part No. AD9874, Texas Instruments Part Nos. CC1020 or CC1101, or the AXSEM AX5042. However, other devices could be utilized.

Figure 4:
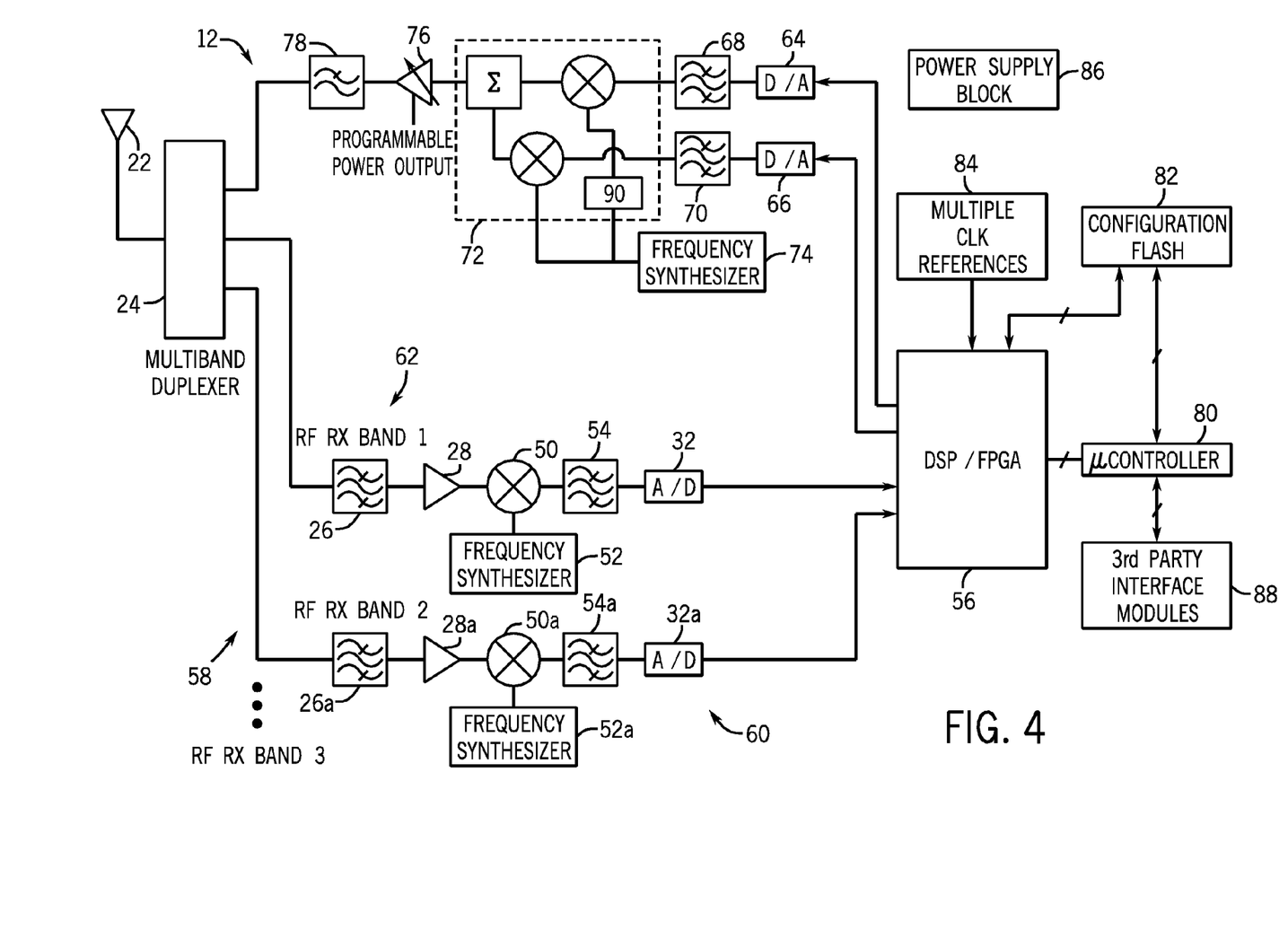
FIG. 4 is a more detailed block diagram illustrating the operation of the home gateway for communicating using multiple RF protocols.

The block diagram in FIG. 4 illustrates a typical implementation of the home gateway 1. As discussed, the antenna 22 will be broadband such that it has reasonable performance parameters at all the required RF bands such as 900 MHz licensed, 900 MHz ISM, 2.4 GHz ISM, etc.

The multi-band duplexer 24 allows the RF signals to be received at various RF bands simultaneously. The duplexer will also facilitate full duplex operation of the radio where incoming RF signals can be received at the same time as RF transmissions occur.

A RF band pass filter 26 with a passband at the desired RF frequency range is used to filter out excess RF noise and limit out of band interference.

A Low Noise Amplifier (LNA) 28 is used to amplify the received RF signal while limiting the added noise level to a minimum.

The received RF signal will be downconverted in frequency to some lower Intermediate Frequency (IF) by the mixer 50 and Frequency synthesizer 52. The synthesizer will be frequency agile such that all channels in the desired RF band can be downconverted.

The IF filter 54 is used to reject any harmonic and intermodulation products that may be created by the downconversion process.

The A/D block 32 is an analog to digital converter that takes the downconverted filtered analog IF signal and digitizes it into a stream of ones and zeroes such that the DSP module 56 can post process the received message in the digital domain using digital signal processing techniques.

Other RF bands, that are very different in frequency, will require a dedicated RF downconversion chain. This is represented by path 58. Therefore, for example, the 2.4 GHz ISM band will be downconverted by the path 60 whereas the 900 MHz band will be downconverted by path 62. Differences between the separate downconverter chains include different RF filter center frequencies, different synthesizer frequencies, and potentially unique IF frequencies. Although only two paths (60, 62) are shown, the system could include additional paths having different filter frequencies.

In the transmit section, digital to analog converters (D/A) 64 and 66 take the in phase (I) and quadrature (Q) encoded and modulated digital baseband data from DSP 56 and convert them to analog baseband or IF signals. IF filters 68 and 70 function to reject harmonics and spurs produced by the digital to analog conversion process.

Blocks 72 and 74 serve to upconvert the IF or baseband analog I and Q signals to the required RF transmission frequencies. Block 72 also serves as a quadrature modulator allowing various RF modulation schemes such as BPSK, QPSK, FSK to be implemented.

The RF power amplifier (PA) 76 serves to amplify the modulated RF signal. The output RF power of the PA will also be programmable such that it meets the output requirements of the specific RF protocol currently being transmitted. The transmit output RF filter 78 serves to remove any harmonic energy created by the amplification process.

The DSP module 56 shown in FIG. 4 is an integrated circuit or a set of ICs that utilizes Digital Signal Processing techniques to demodulate the received RF packets. The DSP chip(s) within the DSP module 56 are programmed with unique firmware code sets to allow the DSP module 56 to demodulate and decode various types of over the air protocols over multiple bands, such as IEEE 802.15.4, Sensus FlexNet, and GSM to name a few, simultaneously. The DSP IC(s) also function to encode and modulate the I and Q digital outputs for RF transmission. The Xilinx Spartan or Vertix family of FPGA ICs, for example, may be used for these functions.

The microcontroller block 80 is responsible for configuration and control of the software radio physical and MAC layers via the DSP module 56, as well as processing all other layers of the communication stacks. It is also responsible for multiple protocol processing for the software radio and any third party interfaces. The Atmel AVR ATMega32 microprocessor, for example, could serve these functions.

The firmware and configuration of the software radio can be updated through any of the third party interfaces. The Flash Memory block 82 contains enough memory to facilitate the storage of the current operational image and configuration, as well as the image and configuration to be uploaded. The flash memory block 82 is in communication with the DSP module 56 such that the DSP module 56 can access information protocols that allow the software radio 12 communicate with the various types of devices located near the home gateway. In addition to the access provided to the DSP module 56, the flash memory block 82 is coupled to the microcontroller 80, which in turn receives information through the third party interface modules 88. In this manner, software programming can be uploaded to the flash memory block 82 and accessed by the DSP module 56 to configure operation of the software radio. In this manner, the software radio 12 can be updated to communicate with various different devices as the devices are placed in communication range with the home gateway.

There will likely be multiple clock references required to be piped to the DSP/FGPA IC module 56 so that the ideal sample rates are possible for the various RF protocols that need to be modulated and demodulated. This is represented by block 84 and typically is implemented as a VC-TCXOs or OCXOs operating at various frequencies.

Block 86 represents the various power supply voltages that will need to be provided to different sections of the printed circuit board. These circuits may include linear voltage regulators, buck and/or boost converters, and power management ICs.

The software defined home gateway shown schematically in FIG. 1 and in more detail in FIG. 4 includes independent programmable radio channels. The software defined home gateway 1 supports multiple simultaneous communication technologies and can be configured to support new technologies as they become available. The software defined home gateway 1 includes memory and communication modules that allow various different types of communication to the home gateway such that the home gateway can be configured to communicate with various different types of devices using software controlled communication techniques. These techniques can be currently available or can be modified as the technology develops or different devices are utilized with the home gateway.

Figure 5A:
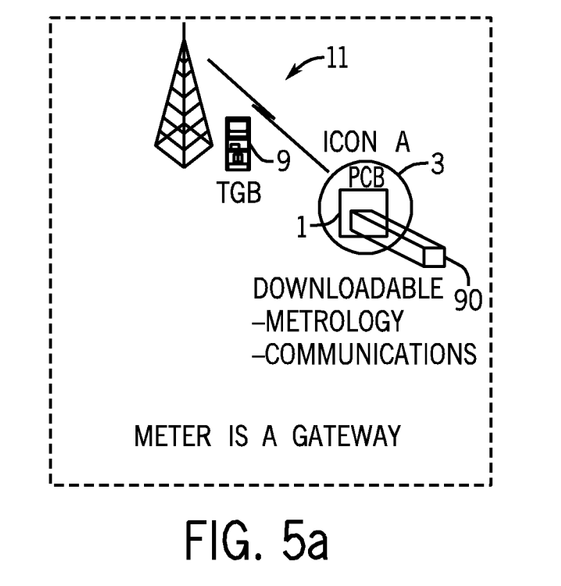
FIGS. 5a-5c are schematic overviews similar to FIG. 1 illustrating alternate types of communication between an AMI system and the home gateway, including an enhanced gateway.
Figure 5B:
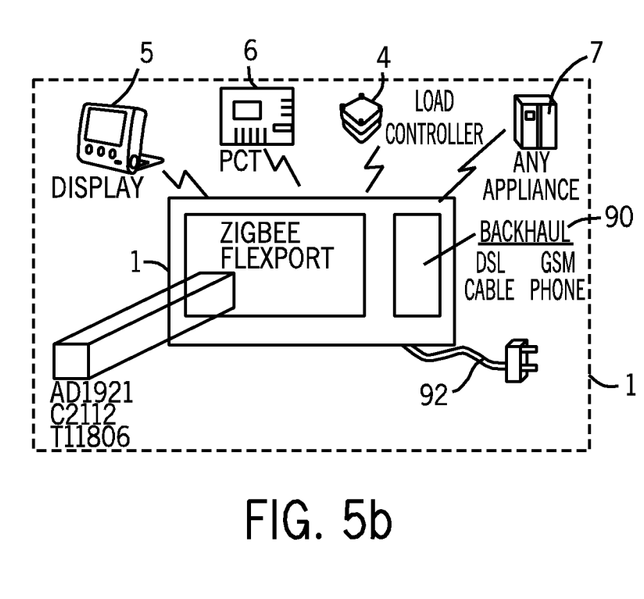
Figure 5C:
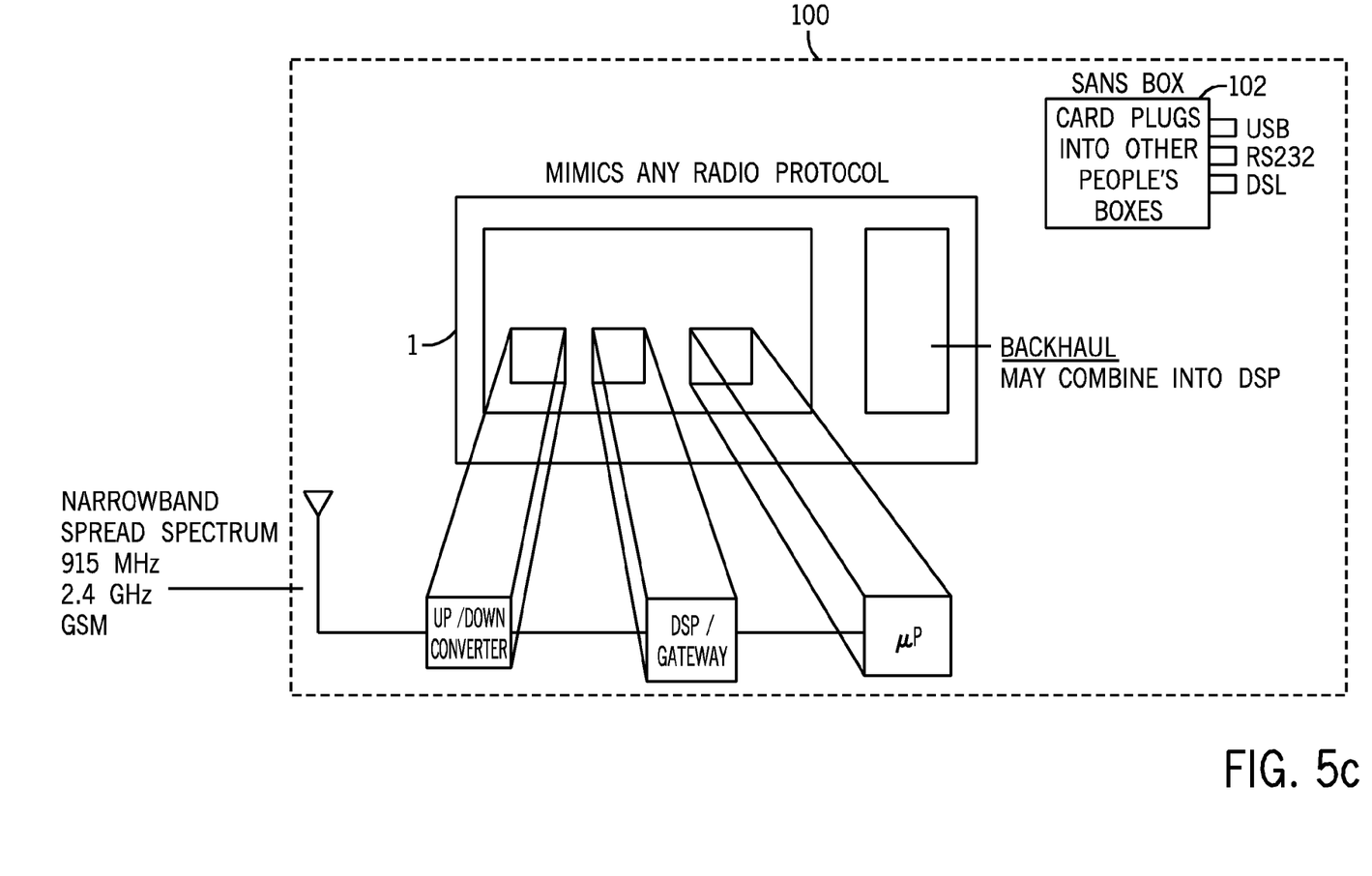

FIGS. 5a-5c are schematic illustrations of three different phases of the possible development of the software based home gateway of the present disclosure. In the first embodiment shown by FIG. 5a, the electricity meter 3 is shown including the home gateway 1. The electricity meter 3 communicates to the utility gateway 9 using the AMI system 11. Further, the home gateway 1 communicates using a wide area network 90. In this manner, the software within the home gateway can be updated for communication to various other devices located in an area near the home gateway 1.

In the embodiment shown in FIG. 5b, the home gateway 1 is shown as a separate device that communications with the various devices using various different communication protocols. Further, the home gateway is connected to the WAN 90 to receive software upgrades as is desired. In this embodiment, the home gateway 1 is a separate device having its own power supply connection 92. In the embodiment illustrated, the home gateway 1 is a set top box that can communicate both to the devices 4-7 as well as to the AMI system 11.

In the third embodiment shown in FIG. 5c, the home gateway 1 can receive a separate card 102 that provides the required communication such that the home gateway 1 can function as desired.

I claim:

1. A system for communicating energy related information from a home to a remotely located utility provider, the system comprising:
    a plurality of devices positioned in the home, the devices each being configured to communicate using only one of a plurality of RF protocols;
    a home gateway positioned in the home and operable to simultaneously communicate with each of the plurality of devices utilizing one of a plurality of different RF protocols over an RF local area network (LAN) and to the utility provider over a wide area network (WAN);
    at least one of the plurality of devices positioned in the home also being configured to communicated to an advanced metering infrastructure (AMI) system independently from the communication to the home gateway;
    wherein the home gateway comprises a multi-band, software defined radio and a protocol emulator, wherein the protocol emulator controls the operation of the radio such that the home gateway simultaneously communicates to more than one of the plurality of devices using more than one of the plurality of RF protocols,
    wherein the protocol emulator is selectively programmable to add new RF protocols for communication in addition to the plurality of RF protocols already present.

2. The system of claim 1 wherein the plurality of devices include utility meters and peripheral devices located within the home.

3. The system of claim 1 wherein the at least one device communicates to the AMI system using a proprietary RF protocol.

4. A method of operating a home gateway to communicate between a plurality of RF enabled devices and a utility, the method comprising the steps of:
    positioning the home gateway in a home;
    configuring a protocol emulator of the home gateway to operate a multi-band radio of the home gateway to communicate with the plurality of RF enabled devices using a plurality of different RF protocols;
    positioning the plurality of RF-enabled devices within communication range of the home gateway;
    configuring the protocol emulator to simultaneously communicate with the plurality of RF enabled devices using the plurality of different RF protocols assigned to the plurality of RF enabled devices;
    transmitting information between the home gateway and the plurality of devices utilizing the RF protocol assigned to each of the devices;
    operating the multi-band radio to communicate information to and from the plurality of RF enabled devices;
    communicating the received information from the plurality of RF enabled devices to the utility over a wide area network; and
    communicating from one or more of the plurality of RF enabled devices to an advanced metering infrastructure (AMI) system independently from the communication to the home gateway.

5. The method of claim 4 further comprising the steps of:
    positioning an additional RF enabled device within range of the home gateway; and
    providing a software protocol to the protocol emulator for communication with the additional RF enabled device such that the multi-band radio can communicate to the additional device utilizing the downloaded RF protocol.

6. The method of claim 5 wherein the software protocol is provided to the home gateway through the wide area network.

7. The method of claim 4 further comprising the step of storing a plurality of RF communication protocols within the protocol emulator, wherein the plurality of RF enabled devices communicate utilizing the stored RF protocols.

8. The method of claim 4 further comprising the step of selectively communicating information from the home gateway to a second home gateway upon interruption of the wide area network to the home gateway.

9. The method of claim 4 wherein the home gateway is incorporated into one of the plurality of RF enabled devices.

* * * * *